(12) United States Patent
Guss et al.

(10) Patent No.: US 8,276,698 B2
(45) Date of Patent: Oct. 2, 2012

(54) ELECTRICALLY PROPELLED VEHICLE

(75) Inventors: Walter Guss, Gössendorf (AT); Helmut Foidl, Graz (AT)

(73) Assignee: Magna Steyr Fahrzeugtechnik AG & Co KG, Graz (AT)

( * ) Notice: Subject to any disclaimer, the term of this patent is extended or adjusted under 35 U.S.C. 154(b) by 546 days.

(21) Appl. No.: 12/280,814

(22) PCT Filed: Feb. 27, 2007

(86) PCT No.: PCT/AT2007/000099
§ 371 (c)(1),
(2), (4) Date: Feb. 17, 2009

(87) PCT Pub. No.: WO2007/095663
PCT Pub. Date: Aug. 30, 2007

(65) Prior Publication Data
US 2009/0242298 A1 Oct. 1, 2009

(30) Foreign Application Priority Data
Feb. 27, 2006 (AT) .................................. 144/2006

(51) Int. Cl.
*B60R 16/04* (2006.01)
(52) U.S. Cl. ........................ 180/68.5; 180/65.1
(58) Field of Classification Search ............... 180/68.5, 180/69.4, 270, 274, 65.1; 296/187.03, 187.05, 296/187.08, 187.11; 280/834, 784
See application file for complete search history.

(56) References Cited

U.S. PATENT DOCUMENTS

| | | | | |
|---|---|---|---|---|
| 3,477,538 A * | 11/1969 | Hall Leslie et al. | ........... | 180/65.1 |
| 4,058,182 A | 11/1977 | Huber | | |
| 4,621,822 A * | 11/1986 | Knochelmann et al. | ...... | 280/834 |
| 5,390,754 A * | 2/1995 | Masuyama et al. | .......... | 180/68.5 |
| 5,681,057 A * | 10/1997 | Whirley et al. | .............. | 180/68.5 |
| 6,637,807 B2 * | 10/2003 | Gotz | ............................ | 180/68.5 |
| 6,662,891 B2 * | 12/2003 | Misu et al. | ................... | 180/68.1 |
| 7,066,515 B2 * | 6/2006 | Pierce et al. | ................. | 180/68.5 |
| 7,070,015 B2 | 7/2006 | Mathews et al. | | |
| 7,503,585 B2 * | 3/2009 | Hashimura et al. | ........... | 280/782 |
| 7,717,050 B2 * | 5/2010 | Park | .............................. | 112/284 |
| 7,717,207 B2 * | 5/2010 | Watanabe et al. | ............ | 180/68.5 |
| 7,921,951 B2 * | 4/2011 | Watanabe et al. | ............ | 180/68.5 |
| 2007/0215399 A1 | 9/2007 | Watanabe et al. | | |
| 2008/0196957 A1 * | 8/2008 | Koike et al. | .................. | 180/68.5 |
| 2009/0090575 A1 * | 4/2009 | Nagasaka | .................... | 180/68.5 |

* cited by examiner

*Primary Examiner* — Hau Phan
(74) *Attorney, Agent, or Firm* — Bachman & LaPointe, P.C.

(57) ABSTRACT

An electrically-propelled vehicle, the battery of which is housed in a battery housing (20) arranged in the rear of the vehicle and under the floor (4) thereof, to be protected against front and rear collisions and restricting the load are as little as possible. The above is achieved by the floor (4) comprising a cut-out (11), larger in plan than the outline of the battery housing (20), the cut-out (11) having a reinforced edge (12), to which front and rear support pieces (13, 30) for the battery housing (20) are fixed, the rear support piece (13) being fixed to the vehicle by a pair of flanges (17, 17') with rearward downwardly inclined stop surfaces (19) and the battery housing (20) is rigid or reinforced.

8 Claims, 2 Drawing Sheets

ELECTRICALLY PROPELLED VEHICLE

BACKGROUND OF THE INVENTION

The invention relates to electrically propelled vehicles, the battery of which is accommodated by a battery box which is arranged in the rear of the vehicle and under the floor thereof. These may be either vehicles having a purely electric drive or else having a hybrid electric drive (internal combustion engine and electric engine which can also operate as a generator). Both have storage batteries (for short: batteries) which are considerably larger and heavier than those in motor vehicles propelled only by an internal combustion engine.

Such batteries take up a large amount of construction space, their momentum caused by their mass in the event of a collision may put the passengers at risk and their content is often chemically aggressive, and therefore they also have to be protected from damage. In addition, the high-power batteries used generally require comprehensive auxiliary equipment (fans, coolant pumps and electronics) which causes noise and has to be accessible for maintenance purposes. Furthermore, the vehicle trunk is to be restricted as little as possible and is to have a flat loading floor.

A vehicle of the type in question is known from DE 25 22 844. The battery is accommodated there in a trough which is suspended in front of the rear axle and below the closed floor panel by means of flanges. The front flange hangs in an angle rail which is welded to a section of the longitudinal sills, which section runs obliquely forward and downward, in such a manner that it forms a predetermined breaking point. As a result, in the event of a head-on collision, the trough is pushed downward at its front edge and is thus deflected from the interior of the vehicle. However, the battery is not protected against a rear collision (a rear-end collision in which the vehicle is rammed from behind).

It is an object of the invention to accommodate and fasten the battery in a vehicle of the type in question in such a manner that it is protected both against head-on collisions and against rear collisions and, what is more, restricts the loading space as little as possible and is accessible.

SUMMARY OF THE INVENTION

It is known from DE 10 2004 023 754 A1, in the event of collisions from behind, to protect a battery arranged in the interior of the vehicle via a crumple zone and a movement converter. The movement converter is a wedge which pushes the rear end of the battery upward in the event of a collision. However, even in the case of normal-sized batteries, this constitutes a risk to the passengers.

According to the invention, this is achieved in that the floor (more precisely: the floor panel) has a cutout which, in top view, is larger than the outline of the battery box, in that the cutout has a reinforced edge to which, at the front and rear, downwardly directed supporting parts for the battery box are fastened, in that the rear supporting part is fastened to the vehicle floor via a pair of flanges having rearwardly and downwardly sloping stop surfaces, and in that the battery box is rigid or reinforced.

In the event of a rear collision, the battery box is pushed forward and, at the same time, its rear edge is pushed downward on account of the sloping stop surfaces such that the battery box pivots downward about the front supporting parts. It is therefore unable to penetrate the interior of the vehicle, but nevertheless remains connected to the vehicle. Owing to said mechanism, the battery may also be accommodated securely behind the rear axle. The reinforcement of the floor panel compensates for the weakening of the floor panel because of the cutout and provides support for the supporting parts. The cutout means that the battery is also accessible from above for maintenance. Since the supporting parts also permit the battery box to be accommodated at a certain distance under the floor panel, the trunk floor remains substantially flat. The reinforced battery box substantially protects the battery against damage and, after being bolted to the floor panel, brings about a further reinforcement of the floor panel via the supporting parts.

The flanges of the rear supporting part having the sloping stop surfaces can be connected to each other in various ways. For this purpose, use is preferably made of shear bolts which are dimensioned in such a manner that they only shear off at a defined impact force and permit the flanges to slide on each other, as a result of which the battery box pivots downward.

The supporting parts act in the same manner if the supporting arms are fastened to the floor in such a manner that they can become detached from the floor panel as the collision progresses. The fastening means are then preferably also shear bolts which act even in the event of a head-on collision.

In an advantageous development, the front supporting part (or the front supporting parts) is fastened to the lower side of the reinforced edge by means of tear bolts and has a horizontal supporting spike which engages displaceably in a supporting plate. In the event of a rear collision, the tear bolts permit the front supporting parts to tilt downward and the battery box to be displaced forward, with the supporting spike ensuring that, even after the tear bolts have torn off or sheared off, the front supporting parts remain connected to the vehicle. It remains "hanging" in the supporting plate. The supporting plate is preferably fastened to the floor of the vehicle and is supported further forward on the floor of the vehicle via a crumple zone located in front of the supporting spike in the direction of travel. The crumple zone may comprise folds which are arranged transversely with respect to the longitudinal direction of the vehicle and have a reinforcing effect during normal operation.

In an advantageous development of the invention, a cover of the battery box is fastened removably to the reinforced edge of the floor panel and sits by means of its edge tightly on the battery box. In the event of a collision, the cover thus frees the path of displacement of the battery box. Since it is fastened to the reinforced edge, it also takes on the sealing with respect to the vehicle interior. The cover of the battery box is preferably composed of plastic and is connected to the battery box in such a manner that it becomes detached therefrom in the event of a collision.

Particular economy of space is obtained if the cover of the battery box contains the electronics associated with the battery, the electronics thus being accessible from the interior of the vehicle. Furthermore, it is advantageous, in order to protect the battery and to damp structure-borne noise, if the battery is supported in the battery box via elastic elements.

BRIEF DESCRIPTION OF THE DRAWINGS

The invention is described and explained below with reference to figures, in which.

DETAILED DESCRIPTION

Figure 1:
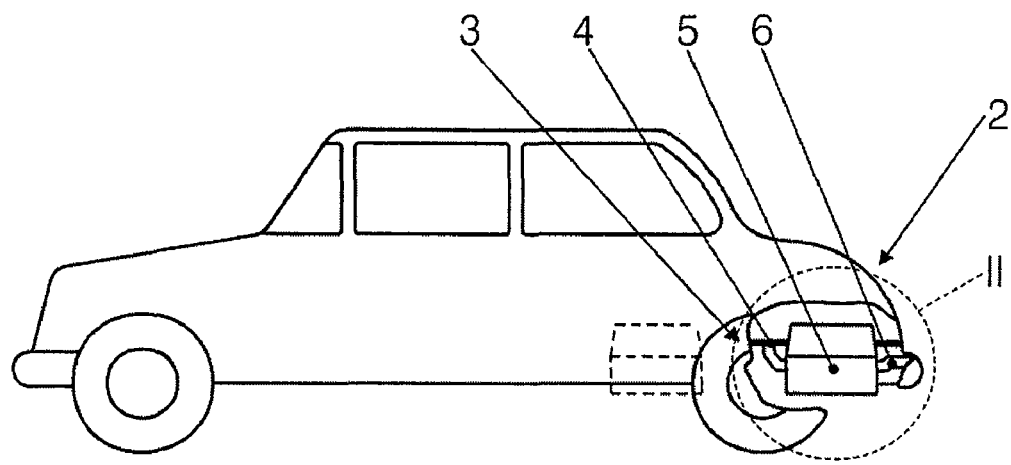
FIG. 1 shows, schematically, a motor vehicle according to the invention.

FIG. 1 indicates a motor vehicle of customary design. Its drive may be purely an electric motor or in hybrid form. Only its rear end 3, which is visible above the rear wheels 2, and the vehicle floor 4 in the rear end are of interest. A very large battery, denoted overall by 5, is arranged under the floor 4 and behind the rear wheels 2. However, it could also be arranged in front of the rear wheels 2 (indicated by dashed lines). Finally, a bumper support 6 is also indicated. The part of the vehicle around the battery 5 has been torn open and is described in more detail below.

Figure 2:
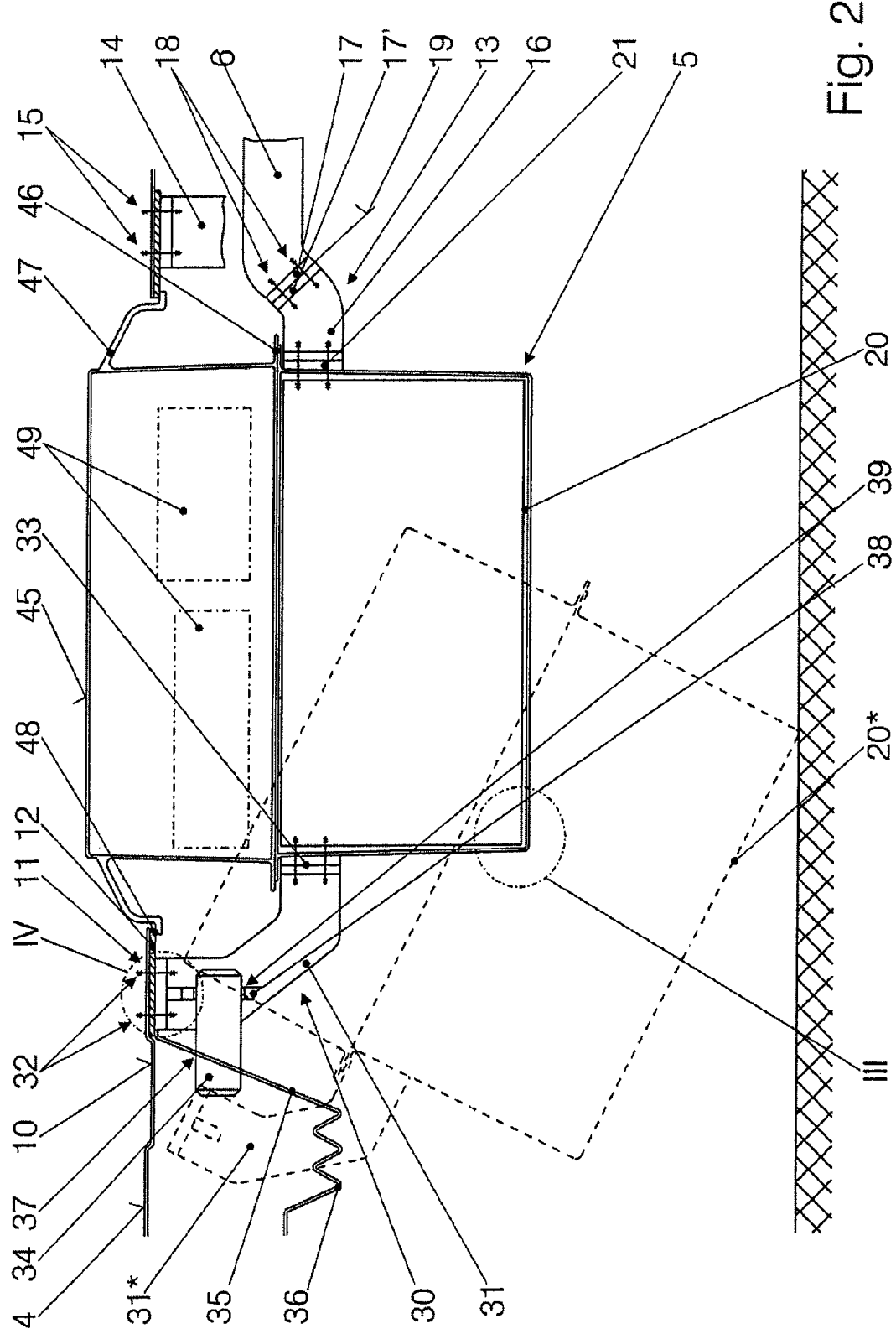
FIG. 2 shows the detail II in FIG. 1.

In FIG. 2, the floor 4 is a floor panel 10 with a cutout 11 which is approximately rectangular in top view and the edge of which has a reinforcing frame 12 running all the way around. Rear supporting parts 13 and front supporting parts 30 for a rigid battery box 20 are fastened thereto. The supporting parts are either individual arms or a single supporting part extending over the width of the cutout 11. The rear supporting part 13 (or the rear supporting parts) comprises a vehicle-mounted part 14 which is connected to the reinforcing frame 12 by means of tear bolts 15 and also, or alternatively, may be connected to the bumper support 6, and a part 16 in the vicinity of the battery. The two parts 14, 16 have flanges 17, 17' which make contact with each other along a stop surface running obliquely rearward and downward and are held together by means of shear bolts 18 or in some other way. The battery box 20 is connected fixedly to the part 16 in the vicinity of the battery by means of a screw connection 21.

The front supporting parts 30 may again also either be a plurality of supporting arms 31 or one supporting arm reaching over the entire width. The supporting arms 31 are connected at the end in the vicinity of the vehicle to the reinforcing frame 12 by means of tear bolts 32, and are bolted at the end in the vicinity of the battery to the battery box 20. A supporting spike 34 is provided for horizontal guidance, said supporting spike engaging at one end in a guide hole 37 in a supporting plate 35 and at the other end in a guide hole 39 in a retaining plate 38. The supporting spike is displaceable in one of the two holes 37, 39 and is secured in the other one in each case, for example by welding. The supporting plate 35 has a folded crumple zone 36, and the holding plate 38 is part of the supporting arm 31.

A cover 45 sits on the battery box 20. It is preferably composed of plastic, is light and sits tightly on a sealing flange 46, which runs all the way around, of the battery box 20. Furthermore, it has above it a collar which likewise runs all the way around and the border 48 of which is connected releasably to the floor panel 10 or the reinforcing frame 12 thereof. The border 48 lies either above or below the floor panel 10 with the reinforcing frame 12. In the former case, it can be lifted out of the interior of the vehicle, in the other case, relatively small maintenance covers (not illustrated) can be provided in the cover 45. Electric assemblies 49, such as, for example, cooling fans, control units, electric switches, etc., are located in the interior of the cover 45.

In the event of a rear collision, for example a typical rear-end accident, the vehicle-mounted part 14 of the rear supporting parts 13 is first of all pushed forward. In the process, the shear bolts 18, upon reaching a certain shearing force (corresponding to the considerable rigidity of the battery box) are sheared off and the flanges 17, 17' can slide on each other along the stop surface 19. In the process, that part 16 of the supporting part 13 which is in the vicinity of the battery is pushed downward such that the battery box 20 pivots downward about the connecting point of the front supporting arm 31 to the reinforcing frame 12. Upon the tilting action, the tear bolts 32 are torn off (if the reinforcing frame 12 does not yield sufficiently), but, owing to the supporting spike 34, the front part of the battery box 20 cannot fall onto the carriageway. The battery box 20 thus remains connected to the vehicle and is slid over the carriageway in a way which does not damage the vehicle.

If the impact force acting from the rear increases further, it is then transmitted by the rear supporting parts 13 via the rigid battery box 20 to the front supporting arms 31 and causes the tear bolts 32 to shear off, as a result of which a forward displacement of the front supporting parts 30 is possible. In this case, the supporting spike 34 acts as a guide, and the crumple zone 36 of the supporting plate 35 absorbs further impact energy.

In the event of a head-on collision, i.e. when the impact force comes from the side which is on the left in FIG. 2, the tear bolts 32 are sheared off, the crumple zone 36 of the supporting plate 35 becomes effective and the remaining impact force, which is still considerable, is conducted by the front supporting arms 31 via the rigid battery box 20 to the rear supporting arms 13 where sliding of the two flanges 17, 17' again causes the entire battery box 20 to pivot downward.

Figure 3:
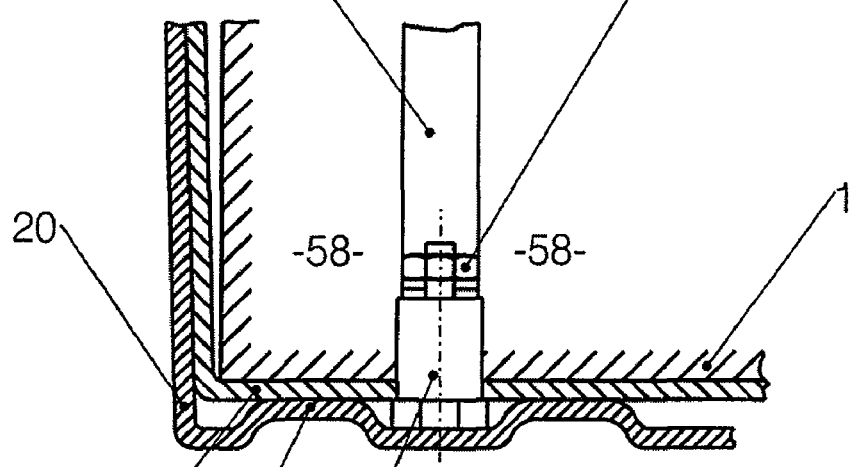
FIG. 3 shows the detail III in FIG. 2.

In FIG. 3, it can also be seen that the battery box 20 has reinforcing beads 53 on its floor and that the battery 58 is supported in the battery box 20 via an elastic intermediate layer 54. In this case, the battery 58 is clamped down on brackets 57, which are connected fixedly to the battery box 20, by means of one (or more) tie rods 55 and bolts 56.

Figure 4:
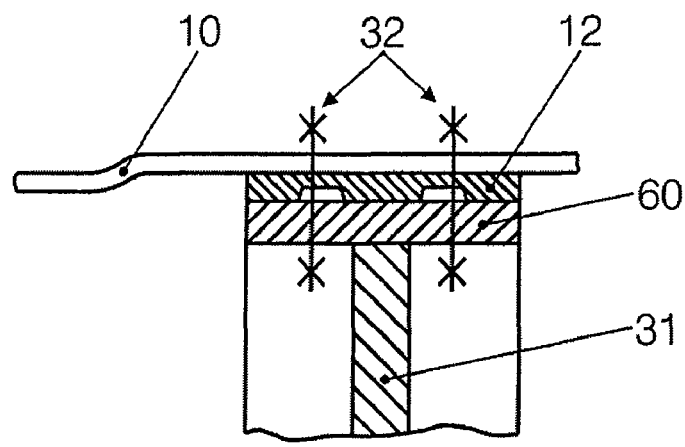
FIG. 4 shows the detail IV in FIG. 2.

FIG. 4 shows in detail how the reinforcing frame 12 is arranged on the lower side of the floor panel 10. The foot 60 of the supporting arm 31 can be seen under the reinforcing frame 12 and is bolted to the reinforcement 12 and the floor panel 10 by means of the tear bolts 32.

The invention claimed is:

1. An electrically propelled vehicle comprising a battery which is accommodated by a battery box which is arranged in a rear of the vehicle and under the floor thereof, and
   a) the floor has a cutout which, in top view, is larger than an outline of the battery box,
   b) the cutout has a reinforced edge to which, at a front and rear of the cutout, downwardly directed supporting parts for the battery box are fastened,
   c) a rear supporting part is fastened to the vehicle via a pair of flanges having rearwardly and downwardly sloping stop surfaces, the pair of flanges make contact with each other along the stop surfaces, the stop surfaces are connected to each other by shear bolts, wherein the shear bolts are dimensioned in such a manner that the shear bolts shear at a defined impact force, and
   d) the battery box is rigid and fastened to the pair of flanges, wherein, in the event of a collision and shearing of the shear bolts, the pair of flanges slide on each other which results in the entire battery box to pivot downward.

2. The vehicle as claimed in claim 1, wherein a front supporting part and the rear supporting part are detachably fastened to the floor so that they become detached from the floor panel in the event of a collision.

3. The vehicle as claimed in claim 1, wherein a front supporting part is fastened to a lower side of the reinforced edge by tear bolts and has a horizontal supporting spike which is displaceable and engages in a supporting plate.

4. The vehicle as claimed in claim 3, wherein the supporting plate is fastened to the floor of the vehicle and is supported on the vehicle by a crumple zone located in front of the supporting spike in the direction of forward travel.

5. The vehicle as claimed in claim 1, wherein a cover of the battery box is fastened removably to the reinforced edge and sits by means of an edge tightly on the battery box.

6. The vehicle as claimed in claim 5, wherein the cover of the battery box is composed of plastic and is releasably connected to the battery box such that it becomes detached in the event of a collision.

7. The vehicle as claimed in claim 5, wherein the cover of the battery box contains electronics associated with the battery.

8. The vehicle as claimed in claim 1, wherein the battery is supported in the battery box by elastic elements.

* * * * *